US005963452A

United States Patent [19]

Etoh et al.

[11] Patent Number: 5,963,452

[45] Date of Patent: Oct. 5, 1999

[54] SYSTEM FOR MANAGING SALES OF GOODS FOR VENDING MACHINES

[75] Inventors: Tadashi Etoh, 9, Haraikatamachi, Shinjuku-ku, Tokyo; Yoshikazu Tomida, Hirakata; Tatsuo Hiramatsu, Musashino; Hironori Mitoh, Osaka; Masahiro Sata, Sakai; Masahiro Seto, Suita; Ryuuji Yoshihara, Higashiosaka; Hiromichi Suzuki, Tokyo, all of Japan

[73] Assignees: Kabushiki Kaisha Media Marketing Network, Tokyo; Sanyo Electric Co., Ltd., Osaka; Tadashi Etoh, Tokyo, all of Japan

[21] Appl. No.: 08/925,641

[22] Filed: Sep. 9, 1997

[30] Foreign Application Priority Data

Sep. 20, 1996 [JP] Japan .................................... 8-250019

[51] Int. Cl.[6] .............................. G06F 17/00; G06F 7/00; G07F 7/00

[52] U.S. Cl. ................................ 364/479.06; 364/479.11; 364/479.14; 364/479.01

[58] Field of Search ......................... 364/479.06, 479.14, 364/479.11, 479.01, 479.02, 479.03, 479.07; 221/2, 3, 4, 9

[56] References Cited

U.S. PATENT DOCUMENTS

| | | | |
|---|---|---|---|
| 4,412,292 | 10/1983 | Sedam et al. | 364/479.11 |
| 4,553,211 | 11/1985 | Kawasaki et al. | 364/479.06 |
| 4,598,378 | 7/1986 | Giacomo | 364/479.06 |
| 4,598,379 | 7/1986 | Awane et al. | 364/479.02 |
| 4,616,323 | 10/1986 | Hayashi | 364/479.02 |
| 4,630,042 | 12/1986 | Kawasaki et al. | 221/4 |
| 4,654,800 | 3/1987 | Hayashi et al. | 364/479.06 |
| 4,766,548 | 8/1988 | Cedrone et al. | 364/479.06 |
| 4,853,684 | 8/1989 | Hoppstadter | 364/479.07 |
| 4,872,541 | 10/1989 | Hayashi | 364/479.11 |
| 4,879,540 | 11/1989 | Ushikubo | 235/385 |
| 5,091,713 | 2/1992 | Horne et al. | 364/479.11 |
| 5,128,861 | 7/1992 | Kagami et al. | 364/403 |
| 5,282,127 | 1/1994 | Mii | 364/479.11 |
| 5,493,364 | 2/1996 | Kuroyanagi et al. | 355/202 |
| 5,608,643 | 3/1997 | Wichter et al. | 364/479.14 |
| 5,781,893 | 7/1998 | Felthauser et al. | 364/479.06 |
| 5,790,409 | 8/1998 | Fedor et al. | 364/479.06 |
| 5,831,860 | 11/1998 | Foldare et al. | 364/479.06 |

*Primary Examiner*—William E. Terrell
*Assistant Examiner*—Wonki K. Park
*Attorney, Agent, or Firm*—Kanesaka & Takeuchi

[57] ABSTRACT

A system for managing sales of goods for vending machines includes a goods control center, a plurality of vending machines, and terminal computers equipped in the respective vending machines. The goods control center includes a host computer for preparing digital data signals as control instructions, and a frequency moderation sub-carrier broadcasting facility as a transmission facility for outputting the digital data signals. Each vending machine has a receiving facility for receiving the digital data signals from the goods control center, and a responding facility. Each terminal computer receives the digital data signals and selectively extracts the digital data as the control instructions necessary for the vending machine to thereby store the digital data necessary for the vending machine in a memory. Each terminal computer controls the vending machine on a basis of the control instructions stored in the memory, obtains goods market information of the vending machine, and outputs the goods market information to the responding facility for reporting the information to the host computer at the goods control center.

6 Claims, 7 Drawing Sheets

SYSTEM FOR MANAGING SALES OF GOODS FOR VENDING MACHINES

SPECIFICATIONS

System for managing sales of goods for vending machines.

BACKGROUND OF THE INVENTION

The present invention relates to a system for managing sales of goods for vending machines, and in particular pertains to a system for rationally carrying out stock control of goods for vending machines and rationally supplying the goods thereto, and a system therefor.

A vending machine is a manpower saving machine which automatically sells goods by putting coins or a card, which is used instead thereof, into the vending machine. The vending machines are roughly classified into three kinds of goods (foodstuffs, drinks, tobacco, etc.), service (money change, coin lockers, etc.), and information (public telephone, automatic weightmeters, etc.), depending to goods to be sold.

There are many kinds specially in vending machines which deals with drinks. They are classified according on the contents of goods (soft drinks, alcohol drinks, milk-oriented drinks), vessels (bottles, cans, cups), and temperature (hod, cold). In a vending machine which sells goods, it is necessary supply goods after the goods is sold.

Whereas, vending machines are installed at various places in city zones, parks, buildings, etc. However, conventionally, in a case where goods is supplied to vending machines, goods which is out of stock are displayed on the panel of a vending machine, whereas information concerning which and how many goods are sold and which and how many goods are left over can not be obtained at the goods control center. The same can be known for the first time by opening the panel of a vending machine at site. Therefore, when supplying goods to vending machines, it is usual that many kinds of goods are conveyed to the site by predicting the quantity of sales of goods in advance and every item of goods must be checked for whether or not they are out of stock, at each of vending machines. Accordingly, for example, as regards vending machines installed at a high story floor, all the goods dealt in the vending machines must be brought into the high story site. At this time, if there are no goods which are short when the vending machine is opened, all the goods brought into the site must be taken back as they are.

As described above, since there are many items of goods in vending machines dealing with soft drinks and those goods of different manufacturers are added thereto, the number of goods which must be prepared for supply will be made huge. Thus, resultantly bringing goods not necessary for supply into the site are not rational nor reasonable in view of the goods sales management. As a prior technology to cope with this disadvantage, a method for transmitting information regarding the quantity of stocks from a vending machine to the goods control center over a telephone line at predetermined times has been known.

However, with this method, since information transmission is commenced at predetermined times at the respective vending machines, such a case occurs, where the transmissions from a number of vending machines are carried out at the same time zone, and telephone lines are busy. In this case, at each of the vending machines, retransmission is tried until the communication with the goods control center becomes possible. Resultantly, at the goods control center side, it is impossible to obtain information in a desired sequence at a desired time. Although it is possible that the set times of each of the vending machines are gradually changed at a suitable interval, in a case where vending machines are newly installed at new places or increased at the existing places, it will become difficult to keep suitable intervals of information transmission time and transmission sequence matched to the convenience of delivery vehicles. Furthermore, in a case where it is desired that the information transmission frequency from each of vending machines is changed according to holidays or a long-term vacation of an enterprise where vending machines are installed or according to an increase or a decrease of people in downtown where vending machines are installed, it is impossible to easily cope with such situations with conventional technologies. In order to solve these disadvantages and inconveniences, it was necessary to carry out very cumbersome operations which were to go around to change the set time of information transmission at a number of or all of vending machines whenever such a request occurred.

SUMMARY OF THE INVENTION

It is therefore an object of the invention to provide a method for rationally managing sales of goods for vending machines and a system therefor, upon obtaining the goods market information from each of vending machines on the basis of signals issued by the goods control center.

With the invention, it is possible to obtain the goods market information from each of vending machines by controlling a plurality of vending machines on the basis of control instructions issued by the goods control center. The market information includes, for example, sales information and out-of-stock information. The sales information is outputted at a predetermined time from a data processing unit of each of vending machines, and the out-of-stock information is instantly outputted. The control instructions issued by the goods control center are formed of digital data and wirelessly transmitted, wherein a data processing unit of a vending machine receives control instructions by radio signals, extracts only the control instructions necessary for itself, stores the control instructions in a memory, controls the vending machine on the basis of the memory contents, and makes a response to the goods control center with respect to the goods market information. The transmission facility of the goods control center is an FM multiplex broadcasting facility, and the vending machines have a receiving facility for receiving control instructions which are FM multiplex broadcasted, and the same makes responses using a telephone line.

DESCRIPTION OF A PREFERRED EMBODIMENT OF THE INVENTION

Figure 1:
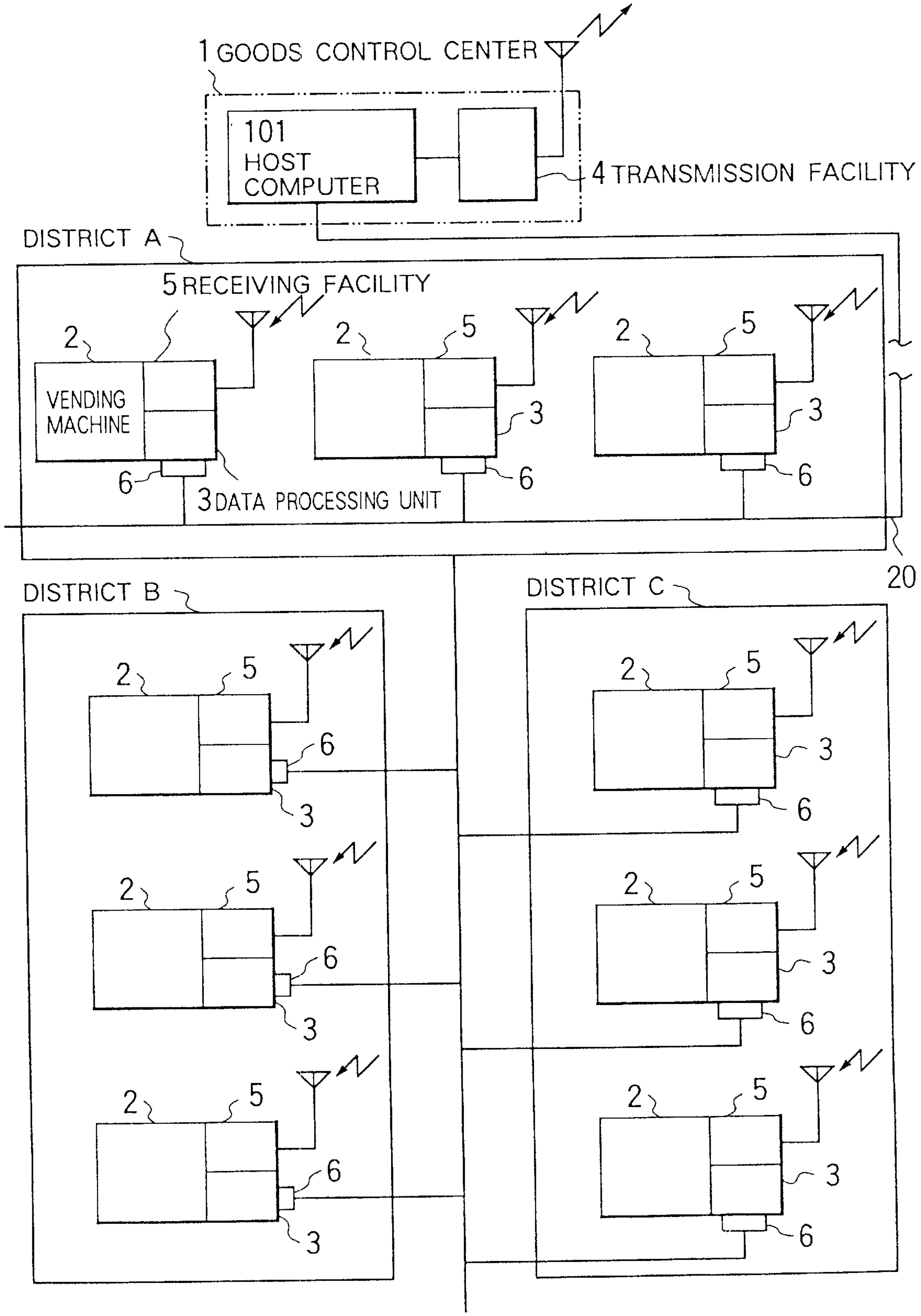
FIG. 1 is a view showing a basic construction of the invention.

Hereinafter, a description will be given of a preferred embodiment of the invention. In FIG. 1, with the invention, signals of control instructions are transmitted from the goods control center 1 to a data processing unit 3 of a vending machine 2 through a transmission facility 4, and the instruction signals are received by a receiving facility 5 of each of the vending machines 2, and the data processing unit 3 controls the vending machine 2 upon receiving the control instructions and makes a response regarding the sales quantity and stock quantity stored in the vending machine 2 to the goods control center 1 through a responding facility 6 as goods market information.

In the invention, the goods control center 1 may be a sales agent, wholesellers, delivery center, retailers, etc. who deliver the goods to the vending machines 2, or may not be limited to a specified place. The same may be a vehicle or an actual goods delivery vehicle which is provided with goods control and instruction features.

Figure 2:
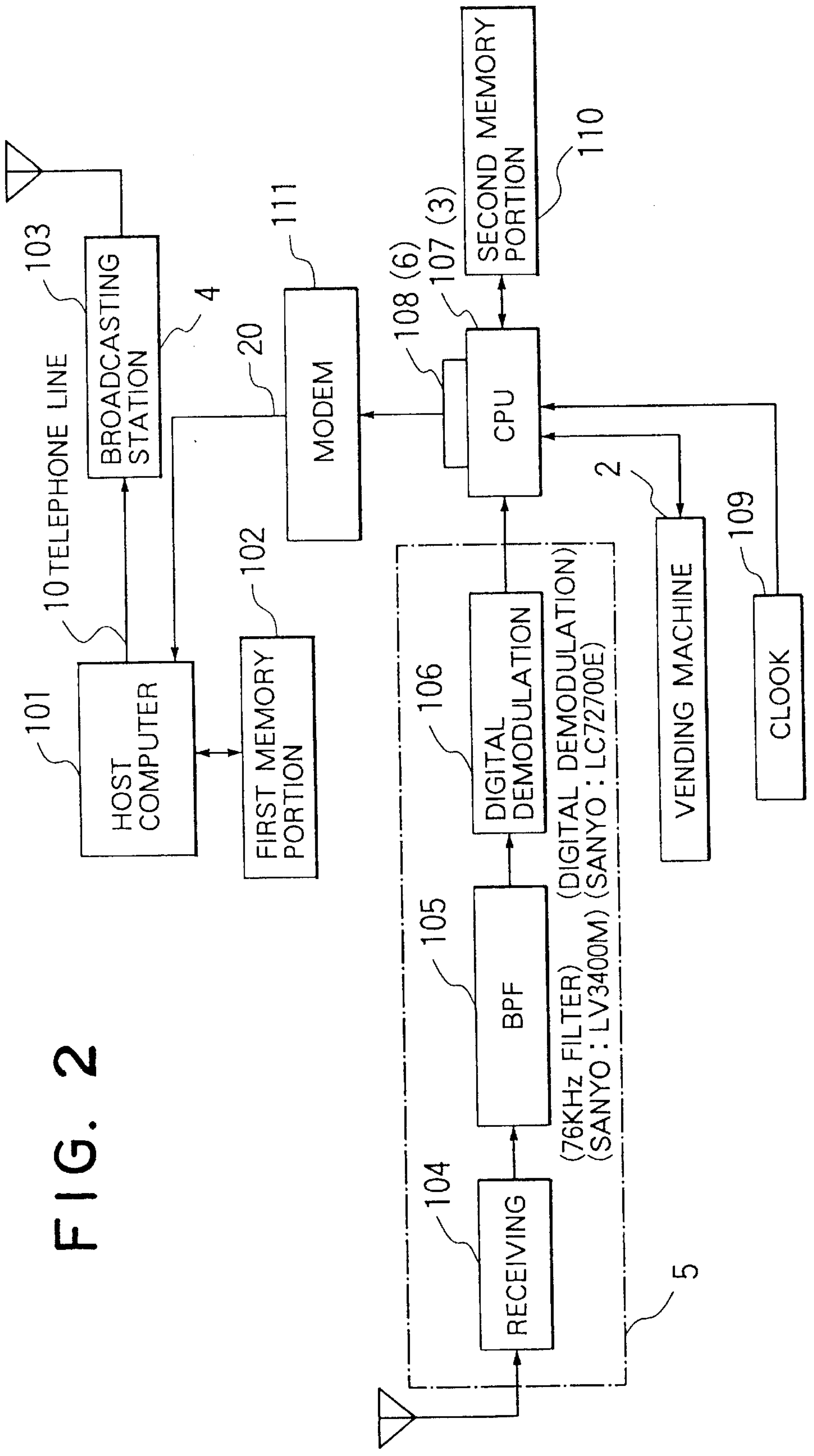
FIG. 2 is a view showing a construction of the goods control center and vending machines.

In FIG. 2, the host computer 101 equipped in the goods control center 1 has a first memory portion 102, and control instructions which control vending machines 2,2, . . . in all the districts to be controlled or individually control them district by district (for example, A, B, C, . . . ) are stored in the first memory portion 102. The control instructions are, for example, a sales response instruction by which the data processing unit 3 of a vending machine 2 responds to inform the goods sale quantity of each of the goods at a predetermined time, and an out-of-stock response instruction by which the data processing unit 3 thereof responds to inform the kinds of goods when specified goods are out of stock. The sales response instruction is an instruction for urging the data processing units 3 of the respective vending machines 2, designating some vending machines 2 district by district with respect to the districts A, B, . . . shown in FIG. 1. In the sales response instruction, it is possible to designate different response times at every vending machine, whereby information is issued from each of vending machines with suitable intervals of time in an adequate sequence. Furthermore, since the designation of the responding time can be changed by only rewriting the data in the goods control center, it is possible to easily cope with fluctuations of demands according to seasons and an increase of vending machines. The out-of-stock responding instruction is an instruction for urging any of the vending machines 2 included in any of the districts to instantly respond when any of the goods is out of stock, without designating the districts. The transmission facility 4 is able to transmit digital data signals of control instructions as radio signals.

A broadcasting station 103 may be used as a transmission facility 4. When the broadcasting station is utilized, the digital data signals of control instructions are transmitted from the host computer 101 of the goods control center 1 to the broadcasting station 103 through a telephone line 10, and the control instructions are broadcasted from the broadcasting station 103. In the invention, when a broadcasting station 103 is utilized for the transmission facility 4, the broadcasting station 103 carries out a part of the features of the goods control center 1.

A vending machine 2 includes a receiving facility 5, a terminal computer 107 of the host computer 101 as a data processing unit 3, a clock 109 and a responding facility 6.

Figure 3:
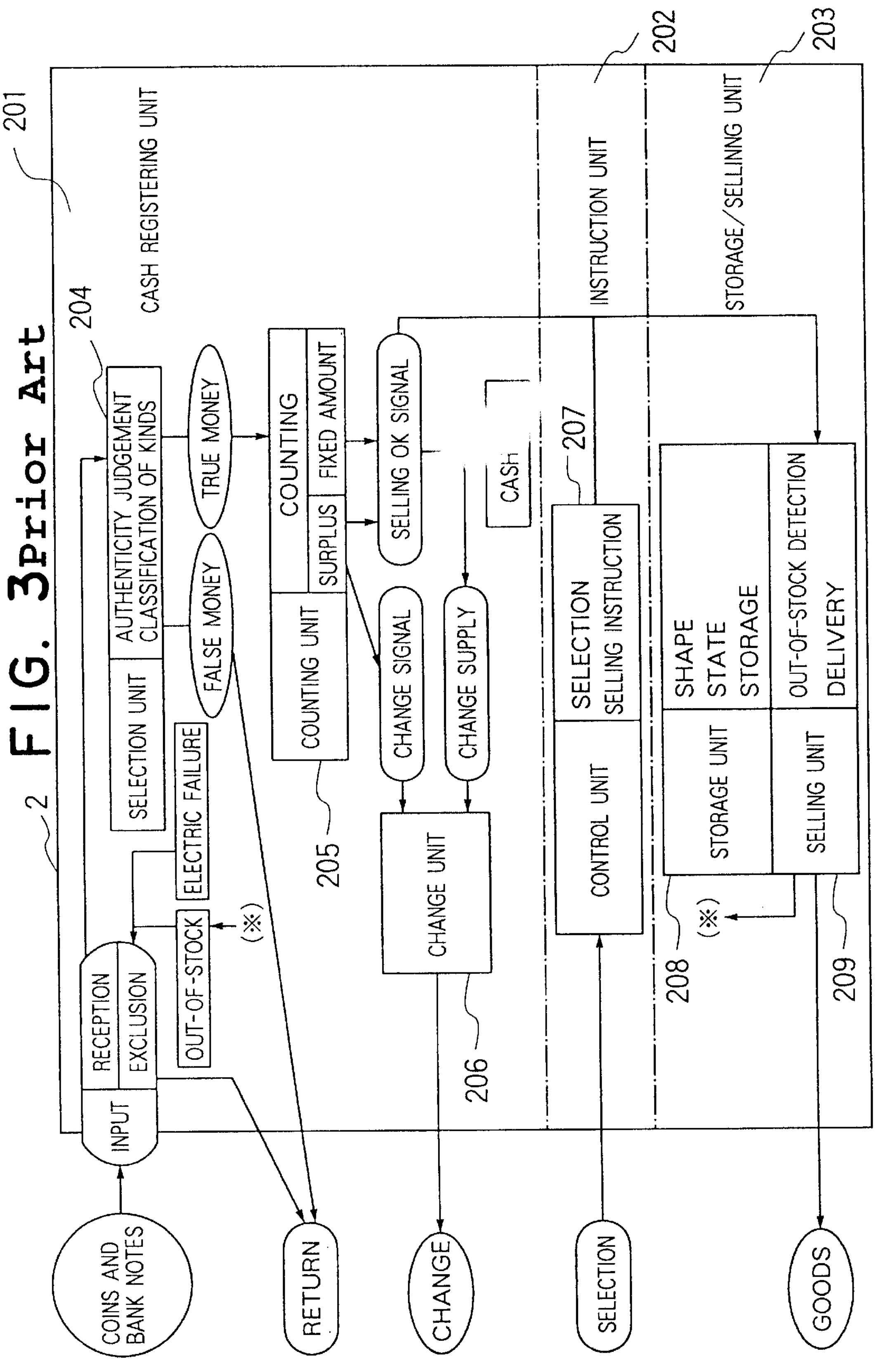
FIG. 3 Prior Art
FIG. 3 is a view showing a construction of a goods vending machine.

FIG. 3 shows one example of the existing vending machines. The vending machine 2 consists of a cash registering unit 201, an instruction unit 202, and a storage and selling unit 203. The cash registering unit 201 receives currencies (coins, bank notes), checks them for whether or not they are false, using a selection unit 204, if they are true currencies, count the amount thereof by a counting unit 205, and issues a “Selling OK signal” when they come up to the required amount. Here, the counting unit 205 issues a “change signal” as necessary, and a change unit 206 delivers “Change” upon receiving this signal. The instruction unit 202 issues a “Selling instruction” of the goods which a user selects by pressing a pushbutton of a control unit 207. The storage and selling unit 203 stores goods in a storage unit 208 in a pattern suitable for the various properties of goods and delivers specified goods, selected upon receiving the “selling instruction”, from a selling unit 209 to the take-out port.

The receiving facility 5 has a receiving portion 104, a band pass filter 105, and a digital demodulator 106. The receiving portion 104 receives electric waves transmitted from the transmission facility 104 and outputs digital modulation signals. The digital modulation signals are reproduced to be digital data by the digital demodulator 106 through the band pass filter 105 and are inputted into the terminal computer 107. The terminal computer 107 processes digital data of the received control instructions, stores all the inputted data or extracted data in the second memory portion 110, and controls a vending machine 2 on the basis of the read-out control instructions, wherein the functions of the cash registering unit 201, instruction unit 202, storage/selling unit 203 of the vending machine 2 are controlled, and the terminal computer 107 outputs the information obtained from the respective units to the responding facility 6. In this embodiment, in response to a sales response information inputted as a control instruction and an out-of-stock instruction, the selling information (or stock information) of each of the goods and the out-of-stock information of goods are outputted to the responding facility 6 as the goods market information.

The responding facility 6 is a telephone facility, in which the modular connector 108 of the terminal computer 107 has a modem 111, and digital data of the goods market information responded from the terminal computer 107 are inputted into the host computer 101 through an telephone line 20, whereby the host computer 101 makes instructions of supplying goods to each of the vending machines based on the goods market information inputted therein. The clock 109 outputs the time information to the terminal computer 107.

In the invention, digital data signals of control instructions wirelessly transmitted from the goods control center 1 to each of the vending machines 2 are issued in one-way communication from the goods control center 1 to each of vending machine 2. The communication thereof is enabled by a data broadcasting such as an FM characters multiplex broadcasting. A broadcasting station 103 having an FM multiplex broadcasting facility is utilized. The responding facility may be an exclusive communication line without depending on general telephone facilities.

Figure 4:
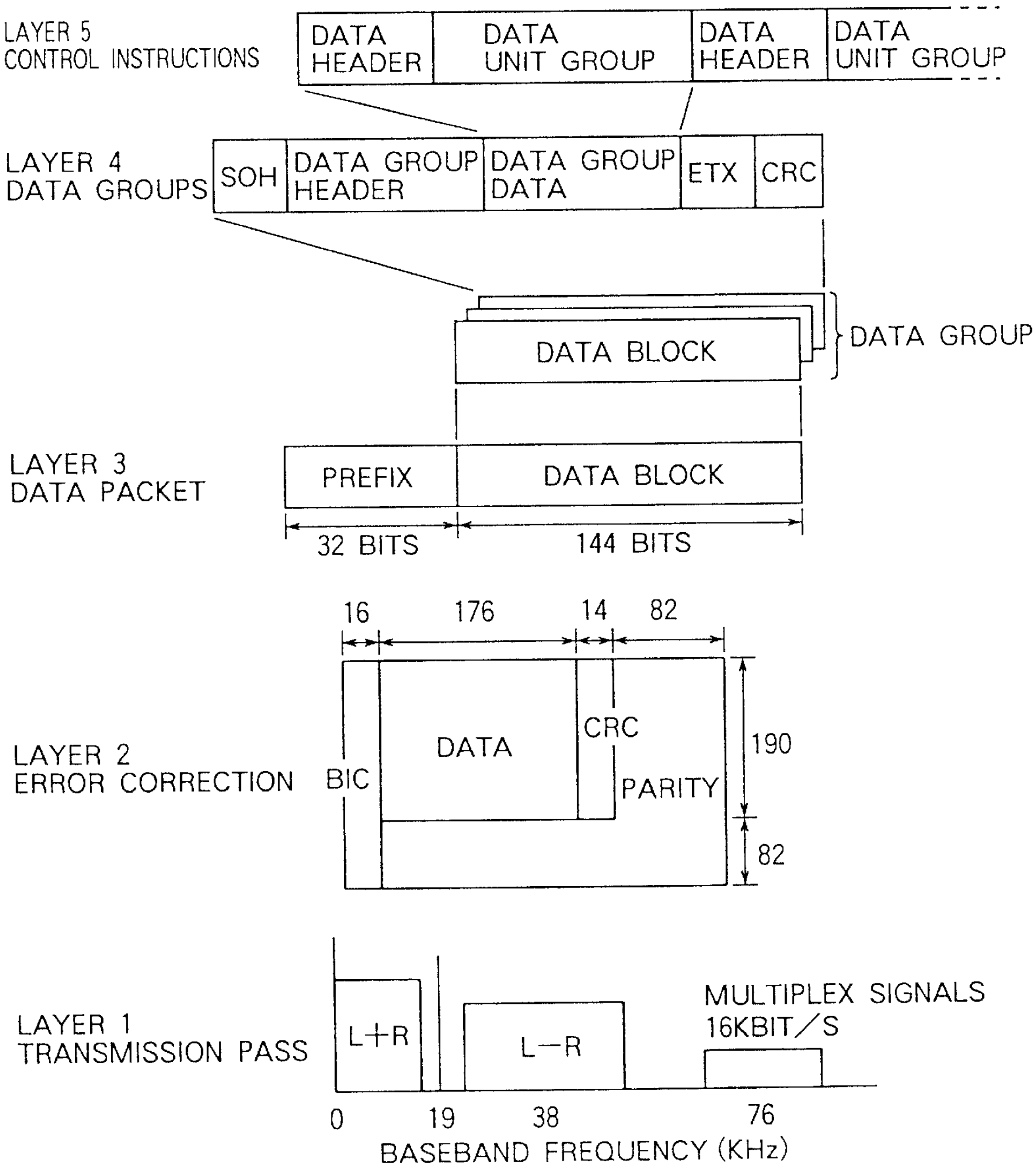
FIG. 4 is a view showing the protocol of FM multiplex transmission unit.

The FM multiplex broadcasting, i.e. FM sub-carrier data broadcasting, is carried out by a broadcasting system in which new signals are multiplexed with a higher frequency than stereo sub-channel signals and simultaneously FM-modulated for broadcasting. For example, DARC system, fixed receiving system, RDS system and other systems are available as this system. The protocol of the DARC system disclosed in a literature (Proc. of Vehicle Navigation & Information Systems Conference (1994) A4-2, Page 111 through Page 116) is shown in FIG. 4. In FIG. 4, the transmission pass properties are designated in the layer 1. Multiplex signals are overlapped at a high frequency side than the L-R signals in addition to the L+R signals and L−R signals which are usual FM stereo broadcasting signals.

In the layer 2, the data frame structure including an error correction system is regulated. Each of the frames consists of 272 blocks in a row direction, and a BIC (Block Identification Code) of 16 bits is added to the top of each block, and the frame synchronization and block synchronization are carried out on the basis of the BIC. 190 blocks out of the 272 blocks in a row direction are packets for transmitting data, and the remaining 82 blocks are parity packets for transmitting the parity in a row direction. Each packet which transmits data is composed of an information portion of 176 bits, CRC (Cyclic Redundancy Code) of 14 bits, which is an error detection code, and a parity portion of 82 bits in the line direction.

That is, as regards the transmission data, one frame is the basic unit, and in this layer, error correction is firstly carried out.

The layer 3 regulates the structure of data packets. The data packet consists of 176 bits excluding the BIC, CRC and parity.

Furthermore, the data packet is composed of a prefix and data blocks. The prefix includes information pertaining to the packets.

The layer 4 regulates the structure of a data group. The data group consists of one or a plurality of data blocks. That is, it is formed that based on the information in the prefix in a data packet, data blocks are juxtaposed to the data block which wears the information finish flag in the prefix from data packet number. These data groups include a CRC which is an error detection code, wherein as regards the data of card information, errors are detected in this layer.

The layer 5 constitutes a set of information data which is transmitted by an FM character multiplex broadcasting, that is, a data unit in which data groups of IDs designating vending machines and districts A,B, . . . , where vending machines are installed, are collected.

In the host computer 101, vending machines 2 are classified according to the districts A, B,C, . . . , and are inputted together with necessary data such as the quantity, names, makers, etc. of goods stored in the respective vending machines 2. These are stored in the first memory portion 102. Thereafter, control instructions of sales responding instructions and out-of-stock responding instructions are prepared as packet data of the layer 3 of the FM multiplex broadcasting shown in FIG. 4, on the basis of the data stored in the first memory portion 102.

Figure 5:
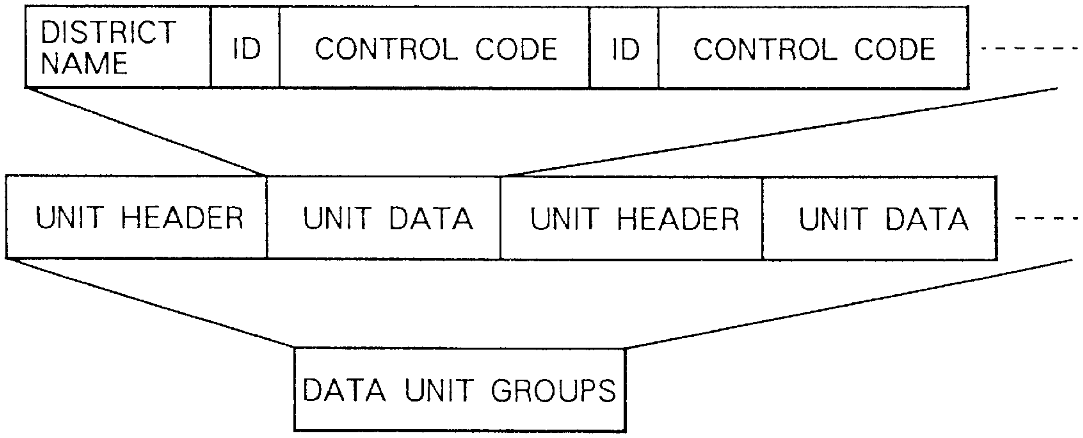
FIG. 5 is a view showing a construction of data unit groups.

The data in the layer 3 is prepared on the basis of the layer 5 which is a set of data units. The data in the layer 5 consists of unit groups. FIG. 5 shows the structure of unit groups and data examples in a unit. The respective units are composed of a unit header existing at the beginning of a unit without fail and unit data which is actual data. The unit data is firstly commenced from a “district name” showing which district A,B,C . . . this unit belongs to a vending machine of, and thereafter, an “ID number” successively designating the individual vending machines, a control code showing the content of the control instruction corresponding to the vending machine carrying the ID number, another ID number, . . . are gradually continued in the order.

The description sequence of the unit data is not limited to this example. Although it is possible to mix vending machines in various districts in the same unit, it is rational that the district name is described at the top of the unit data and control instructions are issued district by district if an operation for supplying goods to the respective vending machines is carried out district by district in turn. As a matter of course, it is possible to prepare such a construction where the data quantity is decreased by compressing the units using a method for compressing the data.

The packet data of the layer 3 is transmitted to the broadcasting station 103 through a telephone line 10, and the digital signals of control instructions are subjected to be on the air in a form of electric waves from the broadcasting station 103.

The digital data signals of control instructions broadcasted are received by a receiving facility 5 of the respective vending machine 2.

Figure 6A:
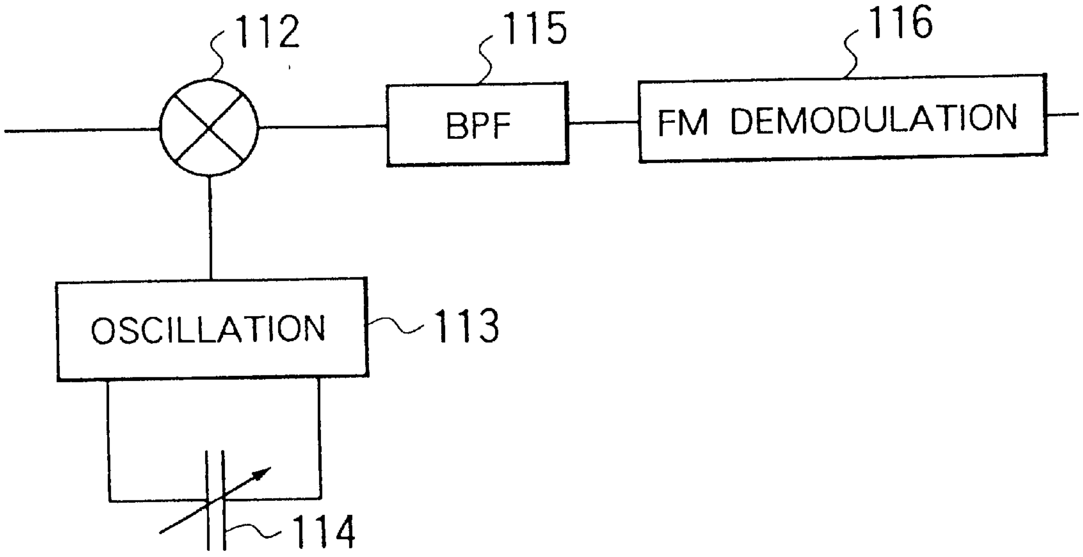
FIG. 6(*a*) and FIG. 6(*b*) are views showing the receiving portion of a receiving facility of vending machines.
Figure 6B:
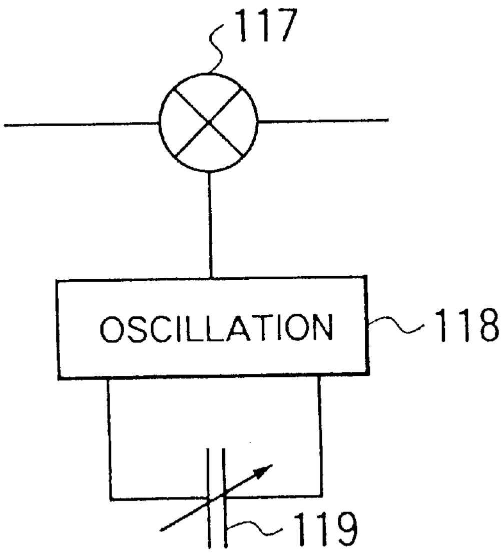

FIG. 6 shows a construction of the receiving portion 104 of the receiving facility 5. FIG. 6(*a*) shows an example of a case where data is transferred by an FM multiplex transmission system, wherein a mixer 112 multiplies the input signal by the output of the oscillator 113 and outputs the multiplication signal to the band pass filter 115. The oscillator 113 oscillates at a single frequency, and a variable capacitor 114 changes the frequency of the oscillator 113 for tuning, wherein only the necessary constituents of the multiplication signals are taken out from the band pass filter 115. Furthermore, FM sound signals and FM multiplex signals are taken out from the FM demodulator 116. They pass through the band pass filter 105 shown in FIG. 2, and only the FM multiplexed signals are taken out. An FM multiplex signal is a kind of digital modulation signal while the same is demodulated to be digital data by the digital demodulator 106 and is inputted into the terminal computer 107.

For example, it is assumed that an FM broadcasting of 80 MHz is inputted into a mixer 112. Since the IF frequency of FM demodulation is usually 10.7 MHz, the oscillator 113 adjusts the oscillation frequency by using a variable capacitor 114 and turns the frequency to 69.3 MHz. As a result, the output of the mixer 112 becomes 10.7 MHz and 149.3 MHz. Since the necessary constituent is only 10.7 MHz, only the constituent of 10.7 MHz is taken out by the band pass filter 115. Thereafter, FM demodulation is carried out by an FM demodulator 116 in order to take out FM sound signals and FM multiplex signals. Furthermore, the FM sound signals are cut off by the band pass filter 105. Furthermore, this construction is described on the basis of a method in which the tuning frequency is adjusted by a variable capacitor. However, a method in which the tuning frequency is adjusted by PLL may be available.

Although FM multiplex broadcasting is employed in FIG. 6(*a*), any sound signals are not necessary in this system. There is no necessity that data is transmitted by the FM multiplex broadcasting. Therefore, an example of transmission data by using MSK signals of the system which is used for FM multiplex signals is shown in FIG. 6(*b*). 117, 118 and 199 are a mixer, an oscillator, and a variable capacitor, respectively. The actions thereof are identical to those of 112, 113 and 114 described in FIG. 6(*a*). In FIG. 6(*b*), the FM demodulation to obtain FM multiplex signals is not required, and 76 KHz which is a carrier frequency of the FM multiplex signals is used as IF signals.

For example, in a case where it is assumed that the carrier frequency is 900 MHz, the oscillator 118 oscillates 899.924 MHz and 76 KHz and 1799.924 MHz are obtained as a mixer output. 1799.924 MHz is not a necessary constituent which is cut off by a band pass filter 105 coming later.

It is thus possible to obtain MSK signals of carrier 76 KHz at the receiving facility 5. The band pass filter 105 is a filter of 76 KHz, for which LV3400M, i.e. an LSI made by SANYO Electric Co., Ltd. can be used. This filter is able to eliminate unnecessary signals such as FM sound signals.

The digital demodulator 106 may be LC72700E which is an LSI for MSK demodulation made by SANYO Electric Co., Ltd., whereby digital data can be obtained by MSK signals. The digital data is processed by a terminal computer 107. The process is shown in a flow chart of FIG. 7.

Figure 7:
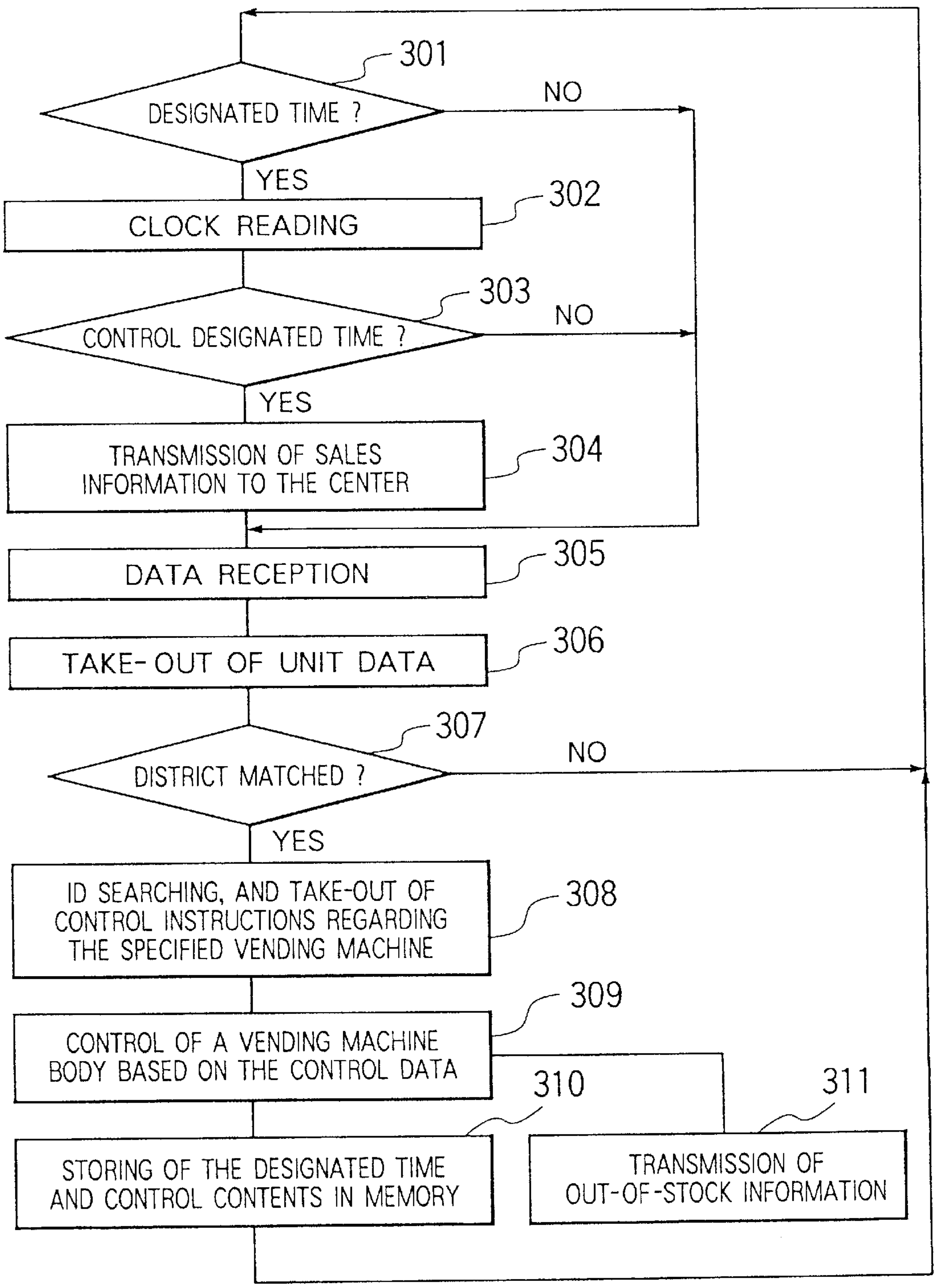
FIG. 7 is a view showing a flow chart of a terminal computer process.

In FIG. 7, the terminal computer 107 receives an input of the time information from a clock 109, and it is judged in step 301 whether or not there is any control instruction to be operated at the designated time. The process jumps to step 305 unless there is any control instruction. If there is a control instruction, the time information is read from the clock in step 302. In step 303, it is checked whether or not the time is the designated time. If not, the process jumps to step 305, and if yes, the sales information (sales quantity or stock quantity for each of the goods stored in a vending machine) is transmitted to the goods control center 1 through a telephone line 20 in step 304. In step 305, the data of control instructions is received and stored in the second memory portion 110. In step 306, the unit data is taken out from the second memory portion 110. In step 307, it is judged whether or not the district designated by the control instructions is the district to which a specified vending machine belongs. If the designated district does not correspond to the specified vending machine, the process returns to step 301. In step 305, the next data is received. In step 307, if the designated district corresponds to the specified vending machine, the ID number is retrieved in step 308 to take out the data of control instructions pertaining to the specified vending machine. In step 309, it is judged what the data of the control instructions is. The specified vending machine 2 is controlled according to the content of the control instruction. Step 310 is a case where the necessary data is transmitted to the goods control center 1 at the designated time, wherein the designated time and content of the control instructions are stored in the second memory portion 110. In step 311, when any one of the goods stored in the specified vending machine 2 is out of stock, the out-of-stock information is instantly outputted to the goods control center 1 as the control content in step 309.

The goods control center 1 receives the goods sales information and out-of-stock information of the respective vending machines 2 belonging to the districts A, B, C, . . . , and construct a rational countermeasure for supplying goods on the basis of the information. For example, when a delivery vehicle supplies goods in the vending machines in the district A, and the goods control center 1 gives the instruction of supply to the delivery vehicle, specifying the quantity and kinds of goods to be supplied for each of the vending machines in the district A. Thereby, the delivery vehicle is loaded with only necessary goods according to a necessary quantity and goes to the district A. As a matter of course, the delivery vehicle can receive the information directly from the vending machines.

Furthermore, in a case of supplying goods to vending machines in the districts B, C, the procedures are identical to those described above. The goods control center 1 periodically or irregularly receives the sales information of the vending machines in each of the districts and receives the out-of-stock information as soon as any of goods becomes out of stock, whereby a proper goods market management can be carried out. As an example of controlling the features of vending machines by control instructions, for example, in a case of stopping sales of alcoholic drinks at night, there is a case where taking-out of such alcoholic drinks is disenabled by controlling the storage and selling unit 203 in the instructed duration of time, or as necessary, the cash registering unit 201 is controlled to disable inputting of cash into a vending machine.

As described, according to the invention, all the functions and features of the cash registering unit, instruction unit, storage/selling unit of the respective vending machines with respect to all the vending machines placed under the control of the goods control center are controlled, and it is possible to take out information from each vending machine at an adequate time, sequence, and frequency, and it is also possible for the goods control center to collect such information as sales quantity, stock quantity, sales amount, selling time, etc. of each of the goods, wherein the goods control center, utilizes the information for rational procurement and shipment of goods and for management of supplying them to vending machines, and such an effect can be brought, where an adequate goods management can be carried out in a rational and adequate manner without any uselessness.

What is claimed is:

1. A system for managing sales of goods for vending machines, comprising:

a goods control center having a host computer for preparing digital data signals as control instructions, and a frequency moderation sub-carrier broadcasting facility as a transmission facility for outputting the digital data signals, a plurality of vending machines for selling goods located remote from the goods control center, each vending machine having a receiving facility for wirelessly receiving the digital data signals as the control instructions broadcasted from the frequency moderation sub-carrier broadcasting facility, and a responding facility, and terminal computers equipped in the respective vending machines, each terminal computer having a memory and receiving the digital data signals through the receiving facility and selectively extracting the digital data as the control instructions necessary for the vending machine where the terminal computer is installed to thereby store the digital data necessary for the vending machine in the memory, each terminal computer controlling the vending machine on a basis of the control instructions stored in the memory, obtaining goods market information of the vending machine where the terminal computer is installed, and outputting the goods market information to the responding facility so that the responding facility reports the goods market information to the host computer at the goods control center.

2. A system for managing sales of goods according to claim 1, wherein said terminal computer obtains out-of-stock information of the goods, which is reported to the host computer whenever one of the goods in one vending machine has been sold out.

3. A system for managing sales of goods according to claim 2, wherein said responding facility is a telephone line connected between each terminal computer and the host computer.

4. A system for managing sales of goods according to claim 3, wherein said terminal computer includes a clock so that when the control instructions include a request of the goods market information at a specific time, the terminal computer provides the goods market information to the host computer at the specific time through the telephone line.

5. A system for managing sales of goods according to claim 4, wherein said control instructions include areas where the vending machines are installed and identifications for the respective vending machines, each vending machine obtaining the control instructions only when an area in the control instructions coincides a location of the vending machine.

6. A system for managing sales of goods for vending machines, comprising:

a plurality of vending machines for selling goods, a goods control center located remote from the vending machines and having a host computer for outputting control instructions for the vending machines and a broadcasting system, terminal computers equipped in the respective vending machines, each terminal computer having a memory and a clock, and providing out-of-stock information for a kind of goods sold out in the vending machine and goods market information of the vending machine where the terminal computer is installed, said goods market information including sale information containing a number of sales quantity of stock of each of goods sold by the vending machine, each terminal computer receiving said control instructions outputted from the host computer, storing said control instructions in the memory, controlling the vending machine on a basis of the control instructions stored in the memory, and providing the goods market information including the sales information at a designated time to the goods control center based on the control instructions and the clock installed therein, each terminal computer outputting the out-of-stock information instantaneously.

* * * * *